(12) United States Patent
Coteus et al.

(10) Patent No.: US 8,151,042 B2
(45) Date of Patent: Apr. 3, 2012

(54) METHOD AND SYSTEM FOR PROVIDING IDENTIFICATION TAGS IN A MEMORY SYSTEM HAVING INDETERMINATE DATA RESPONSE TIMES

(75) Inventors: Paul W. Coteus, Yorktown Heights, NY (US); Kevin C. Gower, LaGrangeville, NY (US); Warren E. Maule, Cedar Park, NY (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 11/843,271

(22) Filed: Aug. 22, 2007

(65) Prior Publication Data

US 2007/0286199 A1 Dec. 13, 2007

Related U.S. Application Data

(63) Continuation-in-part of application No. 11/289,193, filed on Nov. 28, 2005, now Pat. No. 7,685,392.

(51) Int. Cl.
*G06F 12/06* (2006.01)

(52) U.S. Cl. .................. 711/105; 711/154; 711/E12.04

(58) Field of Classification Search .................. 711/105, 711/137, 154, E12.04, E12.081
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | 340/172.5 |
| 4,028,675 A | 6/1977 | Frankenberg | 711/106 |
| 4,135,240 A | 1/1979 | Ritchie | |
| 4,150,428 A | 4/1979 | Inrig et al. | |
| 4,472,780 A | 9/1984 | Chenoweth et al. | |
| 4,475,194 A | 10/1984 | LaVallee et al. | 371/10 |
| 4,479,214 A | 10/1984 | Ryan | |

(Continued)

FOREIGN PATENT DOCUMENTS

EP 0229316 A2 7/1987

(Continued)

OTHER PUBLICATIONS

Yang, Q.; Bhuyan, L.N., "Analysis of packet-switched multiple-bus multiprocessor systems," Computers, IEEE Transactions on, vol. 40, No. 3, pp. 352-357, Mar. 1991.

(Continued)

*Primary Examiner* — Matt Kim
*Assistant Examiner* — Hal Schnee
(74) *Attorney, Agent, or Firm* — Cantor Colburn LLP

(57) ABSTRACT

A method and system for providing identification tags in a memory system having indeterminate data response times. An exemplary embodiment includes a memory controller in a memory system. The memory controller includes a mechanism for receiving data packets via an upstream channel, the data packets including upstream identification tags. The memory controller also includes a mechanism having instructions for facilitating determining if a received data packet is in response to a request from the memory controller. Input to the determining includes an upstream identification tag included in the received data packet. If the received data packet is determined to be in response to a request from the memory controller, then the received data packet is matched to the request, thereby allowing the memory controller to operate with indeterminate data response times.

20 Claims, 8 Drawing Sheets

U.S. PATENT DOCUMENTS

| | | | |
|---|---|---|---|
| 4,486,739 A | 12/1984 | Franaszek et al. | 340/347 |
| 4,641,263 A | 2/1987 | Perlman et al. | |
| 4,654,857 A | 3/1987 | Samson et al. | 371/68 |
| 4,704,717 A * | 11/1987 | King, Jr. | 370/400 |
| 4,723,120 A | 2/1988 | Petty, Jr. | 340/825.02 |
| 4,740,916 A | 4/1988 | Martin | 364/900 |
| 4,782,487 A | 11/1988 | Smelser | |
| 4,796,231 A | 1/1989 | Pinkham | 365/189.05 |
| 4,803,485 A | 2/1989 | Rypinkski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,964,129 A | 10/1990 | Bowden, III et al. | |
| 4,964,130 A | 10/1990 | Bowden, III et al. | |
| 4,985,828 A | 1/1991 | Shimizu et al. | 364/200 |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,410,545 A | 4/1995 | Porter et al. | |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | |
| 5,522,064 A | 5/1996 | Aldereguia et al. | |
| 5,544,309 A | 8/1996 | Chang et al. | 395/183.06 |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,737,589 A | 4/1998 | Doi et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,320 A | 2/1999 | Volkonsky | |
| 5,870,325 A | 2/1999 | Nielsen et al. | 365/63 |
| 5,872,996 A | 2/1999 | Barth et al. | 395/853 |
| 5,881,154 A | 3/1999 | Nohara et al. | |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,088,817 A | 7/2000 | Haulin | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,158,040 A | 12/2000 | Ho | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,198,304 B1 | 3/2001 | Sasaki | |
| 6,215,686 B1 | 4/2001 | Deneroff et al. | 365/52 |
| 6,216,247 B1 | 4/2001 | Creta et al. | |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Frecker et al. | |
| 6,425,044 B1 | 7/2002 | Jeddeloh | |
| 6,446,174 B1 | 9/2002 | Dow | |
| 6,446,224 B1 | 9/2002 | Chang et al. | |
| 6,461,013 B1 | 10/2002 | Simon | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,477,615 B1 | 11/2002 | Tanaka | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | 710/71 |
| 6,502,161 B1 | 12/2002 | Perego et al. | 711/5 |
| 6,505,305 B1 | 1/2003 | Olarig | |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,526,469 B1 | 2/2003 | Drehmel et al. | |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 | 7/2003 | Leddige et al. | |
| 6,590,827 B2 | 7/2003 | Chang et al. | |
| 6,594,713 B1 | 7/2003 | Fuocco et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | |
| 6,622,217 B2 | 9/2003 | Gharacorloo et al. | 711/141 |
| 6,622,227 B2 | 9/2003 | Zumkehr et al. | |
| 6,625,687 B1 | 9/2003 | Halbert et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,636,957 B2 | 10/2003 | Stevens et al. | |
| 6,643,745 B1 | 11/2003 | Palanca et al. | |
| 6,671,376 B1 | 12/2003 | Koto et al. | 380/210 |
| 6,678,811 B2 | 1/2004 | Rentschler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |

| | | | | | | |
|---|---|---|---|---|---|---|
| 6,741,096 B2 | 5/2004 | Moss | | 2001/0029566 A1 | 10/2001 | Shin |
| 6,748,518 B1 | 6/2004 | Guthrie et al. | | 2001/0029592 A1 | 10/2001 | Walker et al. |
| 6,751,684 B2* | 6/2004 | Owen et al. ............... 710/29 | | 2002/0019926 A1 | 2/2002 | Huppenthal et al. ............ 712/15 |
| 6,754,762 B1 | 6/2004 | Curley | | 2002/0059439 A1 | 5/2002 | Arroyo et al. |
| 6,766,389 B2 | 7/2004 | Hayter et al. | | 2002/0083255 A1 | 6/2002 | Greeff et al. ................. 710/305 |
| 6,775,747 B2 | 8/2004 | Venkatraman | | 2002/0103988 A1 | 8/2002 | Dornier .......................... 712/38 |
| 6,791,555 B1 | 9/2004 | Radke et al. | | 2002/0112119 A1 | 8/2002 | Halbert et al. ................ 711/115 |
| 6,792,495 B1 | 9/2004 | Garney et al. | | 2002/0112194 A1 | 8/2002 | Uzelac ......................... 713/500 |
| 6,799,241 B2 | 9/2004 | Kahn et al. | | 2002/0124195 A1 | 9/2002 | Nizar ........................... 713/320 |
| 6,832,329 B2 | 12/2004 | Ahrens et al. | | 2002/0124201 A1 | 9/2002 | Edwards et al. |
| 6,839,393 B1 | 1/2005 | Sidiropoulos ................ 375/371 | | 2002/0156985 A1* | 10/2002 | Abhyankar et al. .......... 711/154 |
| 6,845,472 B2 | 1/2005 | Walker et al. | | 2002/0174274 A1 | 11/2002 | Wu et al. ...................... 710/100 |
| 6,847,583 B2 | 1/2005 | Janzen et al. | | 2003/0009632 A1 | 1/2003 | Arimilli et al. |
| 6,851,036 B1 | 2/2005 | Toda et al. | | 2003/0028701 A1 | 2/2003 | Rao et al. |
| 6,874,102 B2 | 3/2005 | Doody et al. | | 2003/0033364 A1 | 2/2003 | Garnett et al. ................ 709/203 |
| 6,877,076 B1 | 4/2005 | Cho et al. | | 2003/0051055 A1 | 3/2003 | Parrella et al. |
| 6,877,078 B2 | 4/2005 | Fujiwara et al. | | 2003/0056183 A1 | 3/2003 | Kobayashi |
| 6,882,082 B2 | 4/2005 | Greeff et al. | | 2003/0084309 A1 | 5/2003 | Kohn ............................ 713/189 |
| 6,889,284 B1 | 5/2005 | Nizar et al. | | 2003/0090879 A1 | 5/2003 | Doblar et al. ................. 361/728 |
| 6,898,726 B1 | 5/2005 | Lee | | 2003/0105938 A1 | 6/2003 | Cooksey et al. |
| 6,910,146 B2 | 6/2005 | Dow | | 2003/0118044 A1 | 6/2003 | Blanc et al. |
| 6,918,068 B2 | 7/2005 | Vail et al. | | 2003/0126354 A1 | 7/2003 | Kahn et al. |
| 6,925,534 B2 | 8/2005 | David | | 2003/0126363 A1 | 7/2003 | David |
| 6,938,119 B2 | 8/2005 | Kohn et al. | | 2003/0177314 A1* | 9/2003 | Grimsrud et al. ............. 711/137 |
| 6,944,084 B2 | 9/2005 | Wilcox | | 2003/0223303 A1 | 12/2003 | Lamb et al. ............... 365/230.06 |
| 6,948,091 B2 | 9/2005 | Bartels et al. | | 2003/0229770 A1 | 12/2003 | Jeddeloh |
| 6,949,950 B2 | 9/2005 | Takahashi et al. | | 2003/0235222 A1 | 12/2003 | Bridges et al. |
| 6,952,761 B2 | 10/2005 | John | | 2003/0236959 A1 | 12/2003 | Johnson et al. ............... 711/167 |
| 6,965,952 B2 | 11/2005 | Echartea et al. | | 2004/0006674 A1 | 1/2004 | Hargis et al. ................. 711/156 |
| 6,977,536 B2 | 12/2005 | Chin-Chieh et al. .......... 327/116 | | 2004/0015650 A1 | 1/2004 | Zumkehr et al. |
| 6,977,979 B1 | 12/2005 | Hartwell et al. | | 2004/0049723 A1 | 3/2004 | Obara .......................... 714/729 |
| 6,993,612 B2 | 1/2006 | Porterfield | | 2004/0078615 A1 | 4/2004 | Martin et al. |
| 6,996,639 B2 | 2/2006 | Narad | | 2004/0098546 A1 | 5/2004 | Bashant et al. |
| 6,996,766 B2 | 2/2006 | Cypher | | 2004/0098557 A1 | 5/2004 | Dorst |
| 7,039,755 B1 | 5/2006 | Helms | | 2004/0117588 A1 | 6/2004 | Arimilli et al. ............... 711/203 |
| 7,047,370 B1 | 5/2006 | Jeter, Jr. et al. | | 2004/0123222 A1 | 6/2004 | Widmer |
| 7,047,371 B2 | 5/2006 | Dortu | | 2004/0128474 A1 | 7/2004 | Vorbach ......................... 712/10 |
| 7,047,384 B2 | 5/2006 | Bodas et al. | | 2004/0148482 A1 | 7/2004 | Grundy et al. |
| 7,076,700 B2 | 7/2006 | Rieger | | 2004/0160832 A1 | 8/2004 | Janzen et al. |
| 7,091,890 B1 | 8/2006 | Sasaki et al. | | 2004/0163028 A1 | 8/2004 | Olarig |
| 7,103,792 B2 | 9/2006 | Moon | | 2004/0165609 A1 | 8/2004 | Herbst et al. |
| 7,120,743 B2 | 10/2006 | Meyer et al. | | 2004/0199363 A1 | 10/2004 | Bohizic et al. |
| 7,133,790 B2 | 11/2006 | Liou | | 2004/0205433 A1 | 10/2004 | Gower et al. |
| 7,133,972 B2 | 11/2006 | Jeddeloh | | 2004/0230718 A1 | 11/2004 | Polzin et al. ................... 710/22 |
| 7,155,016 B1 | 12/2006 | Betts et al. | | 2004/0246767 A1 | 12/2004 | Vogt ............................. 365/154 |
| 7,177,211 B2 | 2/2007 | Zimmerman ................ 365/201 | | 2004/0250153 A1 | 12/2004 | Vogt ............................. 713/500 |
| 7,194,593 B2 | 3/2007 | Schnepper | | 2004/0260909 A1 | 12/2004 | Lee et al. ...................... 711/213 |
| 7,197,594 B2 | 3/2007 | Raz et al. | | 2004/0260957 A1 | 12/2004 | Jeddeloh et al. .............. 713/300 |
| 7,197,670 B2 | 3/2007 | Boatright et al. | | 2005/0022065 A1 | 1/2005 | Dixon et al. |
| 7,203,318 B2 | 4/2007 | Collum et al. | | 2005/0023560 A1 | 2/2005 | Ahn et al. ..................... 257/200 |
| 7,206,887 B2 | 4/2007 | Jeddeloh | | 2005/0027941 A1 | 2/2005 | Wang et al. |
| 7,206,962 B2 | 4/2007 | Deegan | | 2005/0033906 A1 | 2/2005 | Mastronarde et al. |
| 7,210,059 B2 | 4/2007 | Jeddeloh | | 2005/0044305 A1 | 2/2005 | Jakobs et al. |
| 7,216,196 B2 | 5/2007 | Jeddeloh | | 2005/0050237 A1 | 3/2005 | Jeddeloh et al. ............... 710/10 |
| 7,216,276 B1 | 5/2007 | Azimi et al. | | 2005/0050255 A1 | 3/2005 | Jeddeloh ...................... 710/317 |
| 7,222,213 B2 | 5/2007 | James | | 2005/0066136 A1 | 3/2005 | Schnepper .................... 711/154 |
| 7,227,949 B2 | 6/2007 | Heegard et al. | | 2005/0071542 A1 | 3/2005 | Weber et al. |
| 7,240,145 B2 | 7/2007 | Holman | | 2005/0071707 A1 | 3/2005 | Hampel |
| 7,260,685 B2 | 8/2007 | Lee et al. | | 2005/0078506 A1 | 4/2005 | Rao et al. |
| 7,266,634 B2 | 9/2007 | Ware et al. | | 2005/0080581 A1 | 4/2005 | Zimmerman et al. ......... 702/117 |
| 7,269,765 B1 | 9/2007 | Charlton et al. | | 2005/0081085 A1 | 4/2005 | Ellis et al. |
| 7,296,129 B2 | 11/2007 | Gower et al. | | 2005/0081114 A1 | 4/2005 | Ackaret et al. |
| 7,313,583 B2 | 12/2007 | Porten et al. | | 2005/0081129 A1 | 4/2005 | Shah et al. |
| 7,319,340 B2 | 1/2008 | Jeddeloh et al. | | 2005/0086424 A1 | 4/2005 | Oh et al. |
| 7,321,979 B2 | 1/2008 | Lee | | 2005/0086441 A1 | 4/2005 | Myer et al. |
| 7,334,159 B1 | 2/2008 | Callaghan | | 2005/0097249 A1 | 5/2005 | Oberlin et al. |
| 7,353,316 B2 | 4/2008 | Erdmann | | 2005/0105350 A1 | 5/2005 | Zimmerman et al. |
| 7,363,419 B2 | 4/2008 | Cronin et al. | | 2005/0120157 A1 | 6/2005 | Chen et al. ................... 710/313 |
| 7,363,436 B1 | 4/2008 | Yeh et al. | | 2005/0125702 A1 | 6/2005 | Huang et al. ................. 713/320 |
| 7,370,134 B2 | 5/2008 | Jeddeloh | | 2005/0125703 A1 | 6/2005 | Lefurgy et al. ............... 713/320 |
| 7,376,146 B2 | 5/2008 | Beverly et al. | | 2005/0138246 A1 | 6/2005 | Chen et al. |
| 7,386,575 B2 | 6/2008 | Bashant et al. | | 2005/0138267 A1 | 6/2005 | Bains et al. ................... 711/100 |
| 7,386,771 B2 | 6/2008 | Shuma | | 2005/0144399 A1 | 6/2005 | Hosomi ........................ 711/145 |
| 7,404,118 B1 | 7/2008 | Baguette et al. | | 2005/0149665 A1 | 7/2005 | Wolrich et al. |
| 7,418,526 B2 | 8/2008 | Jeddeloh | | 2005/0166006 A1 | 7/2005 | Talbot et al. |
| 7,421,525 B2 | 9/2008 | Polzin et al. | | 2005/0177677 A1 | 8/2005 | Jeddeloh |
| 7,430,145 B2 | 9/2008 | Weiss et al. | | 2005/0177690 A1 | 8/2005 | LaBerge ....................... 711/154 |
| 7,433,258 B2 | 10/2008 | Rao et al. | | 2005/0204216 A1 | 9/2005 | Daily et al. ................... 714/724 |
| 2001/0003839 A1 | 6/2001 | Kondo ......................... 711/144 | | 2005/0216601 A1* | 9/2005 | Yost ............................. 709/239 |

| | | | |
|---|---|---|---|
| 2005/0216678 A1 | 9/2005 | Jeddeloh | |
| 2005/0216822 A1* | 9/2005 | Kyusojin et al. | 715/501.1 |
| 2005/0220097 A1 | 10/2005 | Swami et al. | |
| 2005/0223196 A1 | 10/2005 | Knowles | |
| 2005/0229132 A1 | 10/2005 | Butt et al. | 716/10 |
| 2005/0235072 A1* | 10/2005 | Smith et al. | 710/22 |
| 2005/0248997 A1 | 11/2005 | Lee | |
| 2005/0257005 A1 | 11/2005 | Jeddeloh et al. | |
| 2005/0259496 A1 | 11/2005 | Hsu et al. | 365/226 |
| 2005/0289292 A1 | 12/2005 | Morrow et al. | |
| 2005/0289377 A1 | 12/2005 | Luong | |
| 2006/0004953 A1 | 1/2006 | Vogt | |
| 2006/0010339 A1 | 1/2006 | Klein | |
| 2006/0036826 A1 | 2/2006 | Dell et al. | |
| 2006/0036827 A1 | 2/2006 | Dell et al. | |
| 2006/0050694 A1* | 3/2006 | Bury et al. | 370/389 |
| 2006/0080584 A1 | 4/2006 | Hartnett et al. | |
| 2006/0085602 A1 | 4/2006 | Huggahalli et al. | |
| 2006/0095592 A1 | 5/2006 | Borkenhagen | |
| 2006/0095679 A1 | 5/2006 | Edirisooriya | |
| 2006/0104371 A1 | 5/2006 | Schuermans et al. | |
| 2006/0107175 A1 | 5/2006 | Dell et al. | |
| 2006/0112238 A1 | 5/2006 | Jamil et al. | |
| 2006/0161733 A1 | 7/2006 | Beckett et al. | |
| 2006/0162882 A1 | 7/2006 | Ohara et al. | |
| 2006/0168407 A1 | 7/2006 | Stern | |
| 2006/0179208 A1 | 8/2006 | Jeddeloh | |
| 2006/0190674 A1 | 8/2006 | Poechmueller | |
| 2006/0195631 A1 | 8/2006 | Rajamani | |
| 2006/0206742 A1 | 9/2006 | James | |
| 2006/0212666 A1 | 9/2006 | Jeddeloh | |
| 2006/0224764 A1 | 10/2006 | Shinohara et al. | |
| 2006/0271746 A1* | 11/2006 | Meyer et al. | 711/148 |
| 2006/0277365 A1 | 12/2006 | Pong | |
| 2006/0288172 A1 | 12/2006 | Lee et al. | |
| 2007/0005922 A1 | 1/2007 | Swaminathan et al. | |
| 2007/0016698 A1* | 1/2007 | Vogt | 710/1 |
| 2007/0025304 A1 | 2/2007 | Leelahakriengkrai et al. | |
| 2007/0038907 A1 | 2/2007 | Jeddeloh et al. | |
| 2007/0067382 A1 | 3/2007 | Sun | |
| 2007/0083701 A1 | 4/2007 | Kapil | |
| 2007/0160053 A1 | 7/2007 | Coteus | |
| 2008/0043808 A1 | 2/2008 | Hsu et al. | |
| 2008/0162807 A1 | 7/2008 | Rothman et al. | |
| 2008/0163014 A1 | 7/2008 | Crawford et al. | |
| 2008/0222379 A1 | 9/2008 | Jeddeloh | |
| 2009/0003335 A1* | 1/2009 | Biran et al. | 370/389 |
| 2009/0006900 A1 | 1/2009 | Lastras-Montano et al. | |

FOREIGN PATENT DOCUMENTS

| | | |
|---|---|---|
| EP | 0470734 A1 | 2/1992 |
| EP | 0899743 A2 | 6/1998 |
| EP | 1429340 A2 | 6/2004 |
| GB | 2396711 A | 6/2004 |
| JP | 59153353 A | 9/1984 |
| JP | 0114140 A | 6/1989 |
| JP | 0432614 | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9812651 | 3/1998 |
| WO | 0004481 A2 | 1/2000 |
| WO | 0223353 A2 | 3/2002 |
| WO | WO2005038660 | 4/2005 |
| WO | 2007109888 | 10/2007 |

OTHER PUBLICATIONS

Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.
PCT International Search Report PCT/EP2006/068984. Mailed Feb. 16, 2007.
PCT International Search Report PCT/EP2007/057916. Mailed Dec. 14, 2007.
International Search Report, International Application No. PCT/EP2007/054929, International Publication No. WO 2007/135144 A1, received Mar. 21, 2008.
IBM. IBM WebSphere Enterprise Service Bus. Version 6.0.2 2006 (165-0071-USC NOA Jun. 12, 2009).
BEA Systems Inc. Integration of Clustered BEA AquaLogic Service Bus Domain and Remote Tibco Enterprise Message Service 4.2.0 for Messaging Application in SOA. BEA White Paper. 2006 (165-0071-USC NOA Jun. 12, 2009).
Oracle. Oracle Enterprise Service Bus. Oracle Data Sheet. Oct. 2006 (165-0071-USC NOA Jun. 12, 2009).
Benini, et al., "System-Level Powers Optimization: Techniques and Tools", ACM Transactions on Design Automation of Electronic Systems, vol. 5, No. 2, Apr. 2000, pp. 115-192.
Boudon, et al., "Novel Bus Reconfiguration Scheme With Spare Lines", IBM Technical Disclosure Bulletin, May 1987, vol. 29, No. 12, pp. 1-3.
Brown, et al "Compiler-Based I/O Prefetching for Out-of-Core Applications", ACM Transactions on Computer Systems, vol. 19, No. 2, May 2001, pp. 111-170.
Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.
IEEE, "IEEE Standard Test Access Port and Boundary-Scan Architecture", Jul. 23, 2001, IEEE Std 1149-1-2001, pp. 11-13.
JEDEC Solid State Technology Association, "JEDEC Standard: DDR2 SDRAM Specification", Jan. 2004, JEDEC, Revision JESD79-2A, p. 10.
Jungjoon Kim et al.; "Performance and Architecture Features of Segmented Multiple Bus System;" IEEE Computer Society; 1999 International Conference on Parallel Processing (ICPP '99).
Massoud Pedram, "Power Minimization in IC Design Principles and Applications", ACM Transactions on Design Automation of Electronic Systems vol. 1, No. 1, Jan. 1996, pp. 3-56.
Natarajan, et al., "A Study of Performance Impact of Memory Controller Features in Multi-Processor Server Environment", pp. 80-87.
NB940259 (IBM Technical Disclosure Bulletin, Feb. 1994; vol. 37; pp. 59-64).
Nilsen, "High-Level Dynamic Memory Management for Object-Oriented Real-Time Systems", pp. 86-93.
P.R. Panda, "Data and Memory Optimization Techniques for Embedded Systems", ACM Transactions on Design Automation of Electronic Systems, vol. 6, No. 2, Apr. 2001, pp. 149-206.
Penrod, Lee, "Understanding System Memory and CPU Speeds: A laymans guide to the Front Side Bus (FSB)", Dec. 28, 2005, Direction . Org, pp. 1-5, http://www.directron.com/directron/fsbguide.html. [online]; [retrieved on Feb. 23, 2006]; retrieved from the Internet.
Rosenberg, "Dictionary of Computers, Information Processing & Telecommuications", Second Edition, John Wiley & Sons, Inc. 1987. 3 pgs.
Seceleanu et al.; "Segment Arbiter as Action System;" IEEE 2003 pp. 249-252.
Singh, S., et al., "Bus Sparing for Fault-Tolerant System Design", IBM Technical Disclosure Bulletin, Dec. 1991, vol. 34, No. 71, pp. 117-118.
Sivencrona et al.; "RedCAN™: Simulations of two Fault Recovery Algorithms for CAN;" Proceedings for the 10th IEEE Pacific Rim International Symposium on Dependable Computing (PRDC'04); 2005.
U.S. Appl. No. 11/419,586, filed May 22, 2006. Robert Tremaine. "Systems and Methods for Providing Remote Pre-Fetch Buffers".
Wang, et al., "Guided Region Prefetching: A Cooperative Hardware/Software Approach", pp. 388-398.
Wikipedia, Serial Communications, [online], [retrieved Apr. 10, 2007 from the Internet], http://en.wikipedia.org/wilci/Serial_communications,p. 1.
Joe Jeddeloh, Fully Buffered DIMM (FB-DIMM), XP002490174, Advanced Systems Technology, Micron Technology, Inc. Apr. 16, 2008, 23 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.

European Search Report, European Patent Application 05106700.7, received Aug. 11, 2008.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837.4, mailed Oct. 7, 2008, 5 pages.

PCT Search Report. PCT/EP2007/057915. Mailed Nov. 7, 2007.

* cited by examiner

DOWNSTREAM IDENTIFICATION TAG —600
    SOURCE OF THE REQUEST —602
    PRIORITY OF THE REQUEST —604
    REQUEST IDENTIFIER —606

FIG. 6

UPSTREAM IDENTIFICATION TAG —700
    REQUESTED IDENTIFIER BIT —702
    SOURCE OF THE REQUEST —704
    PRIORITY OF THE REQUEST —706
    REQUEST IDENTIFIER —708
    CONTINUATION BIT —710
    SOURCE OF THE READ DATA —712
    FAULT TOLERANT ENCODING —714

FIG. 7

UPSTREAM IDENTIFICATION TAG —800
   REQUESTED IDENTIFIER BIT —802
   PHYSICAL ADDRESS RANGE OF THE DATA —804
   SOURCE OF THE DATA —806
   REASON FOR UNREQUESTED DATA —808
   PRIORITY OF THE READ DATA —810
   CONTINUATION BIT —812
   FAULT TOLERANT ENCODING —814

FIG. 8

METHOD AND SYSTEM FOR PROVIDING IDENTIFICATION TAGS IN A MEMORY SYSTEM HAVING INDETERMINATE DATA RESPONSE TIMES

CROSS-REFERENCE TO RELATED APPLICATIONS

This application is a continuation-in-part of U.S. patent application Ser. No. 11/289,193 filed Nov. 28, 2005, the contents of which are incorporated by reference herein in their entirety.

BACKGROUND OF THE INVENTION

This invention relates to memory systems comprised of hub devices connected to a memory controller by a daisy chained channel. The hub devices are attached to, or reside upon, memory modules that contain memory devices. More particularly, this invention relates to the flow control of read data and the identification of read data returned to the controller by each hub device.

Many high performance computing main memory systems use multiple fully buffered memory modules connected to a memory controller by one or more channels. The memory modules contain a hub device and multiple memory devices. The hub device fully buffers command, address and data signals between the memory controller and the memory devices. The flow of read data is controlled using either a leveled latency or position dependant latency technique. In both cases, the memory controller is able to predict the return time of read data requested from the memory modules and to schedule commands to avoid collisions as read data is merged onto the controller interface by each memory module.

In some cases, the memory controller is able to issue a read data delay adder along with the read command. This instructs the targeted hub device to add additional delay to the return of read data in order to simplify the issuing of commands and to avoid collisions. In all cases, the read data must be returned in the order in which it was requested. Further, the total read data latency must be completely predictable by the memory controller. During run time operations, these two restrictions result in additional gaps being added to packets of read data that are returned from the memory modules. This adds latency to the average read operation. In addition, hubs are not able to use indeterminate techniques to return read data faster or slower than normal. These techniques include, but are not limited to, caching read data locally, reading memory devices speculatively, independently managing memory device address pages, data compression, etc.

To optimize average read data latency under real workload conditions, and to enable advanced hub device capabilities, what is needed is a way to allow memory modules to return read data to the memory controller at an unpredicted time. This must be done in a way that does not corrupt read data and that allows the memory controller to identify each read data packet. Preventing data corruption by avoiding data collisions is especially complicated as hub devices merge local read data onto a cascaded memory controller channel.

BRIEF SUMMARY OF THE INVENTION

An exemplary embodiment includes a memory controller in a memory system. The memory controller includes a mechanism for receiving data packets via an upstream channel, the data packets including upstream identification tags. The memory controller also includes a mechanism having instructions for facilitating determining if a received data packet is in response to a request from the memory controller. Input to the determining includes an upstream identification tag included in the received data packet. If the received data packet is determined to be in response to a request from the memory controller, then the received data packet is matched to the request, thereby allowing the memory controller to operate with indeterminate data response times.

Another exemplary embodiment includes a method for providing indeterminate data response times in a memory system. The method includes receiving a data packet at an upstream device via an upstream channel in a memory system, the data packet including an upstream identification tag. It is determined if the received data packet is in response to a request from the upstream device, with input to the determining including the upstream identification tag. If the received data packet is determined to be in response to a request from the upstream device, then the received data packet is matched to the request. If the received data packet is determined not to be in response to a request from the upstream device, then the data packet is processed in response to contents of the upstream data tag. Thus, the memory system operates with indeterminate data response times and unrequested data packets.

Another exemplary embodiment includes a hub device in a memory system. The hub device includes a mechanism for creating a local data packet, the local data packet including an upstream identification tag for identifying contents of the data packet. The hub device also includes a mechanism for transmitting the local data packet to an upstream device. The hub device further includes a mechanism for receiving a data packet via an upstream channel, the received data packet including an upstream identification tag. A mechanism included on the hub device includes instructions for facilitating determining if the received data packet is in response to a request from the hub device. Input to the determining includes the upstream identification tag included in the received data packet. If the received data packet is determined to be in response to a request from the hub device, then the received data packet is matched to the request.

BRIEF DESCRIPTION OF THE DRAWINGS

Referring now to the drawings wherein like elements are numbered alike in the several FIGURES:

FIG. 6 depicts a downstream identification tag in an embodiment;

FIG. 7 depicts an upstream identification tag in an embodiment

FIG. 8 depicts an upstream identification tag which may be utilized for an upstream data packet which is locally initiated without the receipt of a data request in an embodiment.

DETAILED DESCRIPTION OF THE PREFERRED EMBODIMENTS

Exemplary embodiments utilize controller channel buffers (CCBs), read data frame formats with identification tags and a preemptive data merge technique to enable minimized and indeterminate read data latency. Exemplary embodiments allow memory modules to return read data to a memory controller at an unpredicted time. Identification tag information is added to the read data packet to indicate the read command that the data is a result of, as well as the hub where the data was read. The identification tag information is utilized by the controller to match the read data packet to the read commands issued by the controller. By using the identification tag information, read data can be returned in an order that is different from the issue order of the corresponding read commands.

Exemplary embodiments also provide a preemptive data merge process to prevent data collisions on the upstream channel when implementing the indeterminate read data latency. A CCB is added to the hub device to temporarily store read data. When a memory device on the memory module reads data, the data is transferred from the memory interface to the buffer. When the hub device detects that an upstream data packet (i.e., a data packet being sent to the controller from a hub device that is downstream from the detecting hub device) is not in the middle of being transferred into the detecting hub device via an upstream channel (it typically takes several transfers to send the entire data packet), the detecting hub device checks to see if there is a read data packet in its CCB that is waiting to be sent upstream. If the hub device detects a read data packet in the CCB it drives the read data packet from the CCB onto the upstream data bus. In the meantime, if a new upstream data packet is received via the upstream data bus, the data packet is stored in the CCB on the hub device. In this manner, data packets coming upstream do not collide with data packets being sent upstream from the CCB on the hub device. In the case where there is more than one data packet in the CCB, a variety of methods may be implemented to determine which data packet to send next (e.g., the data packet from the oldest read command may be sent first).

Figure 1:
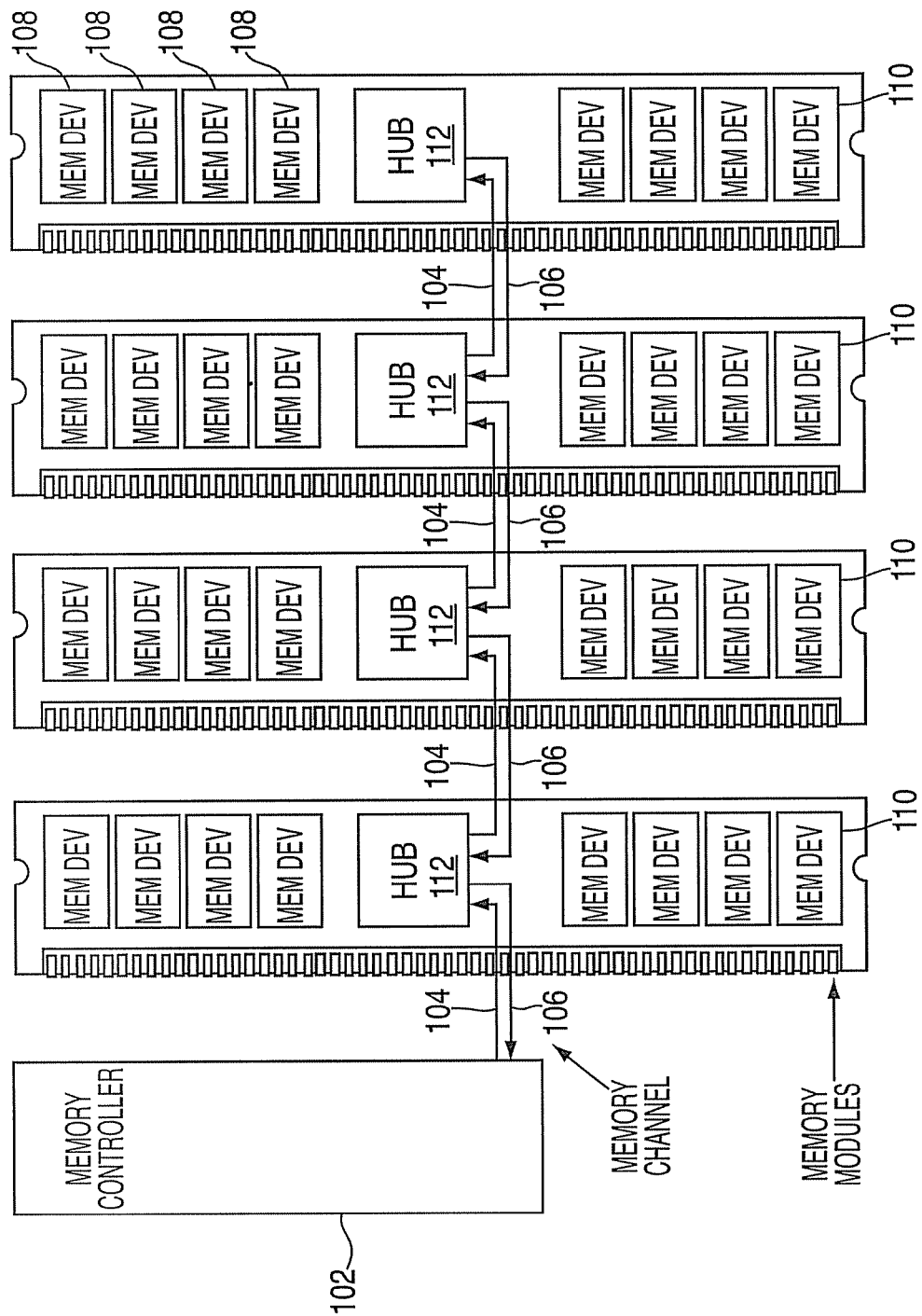
FIG. 1 depicts an exemplary memory system with multiple levels of daisy chained memory modules with point-to-point connections.

Exemplary embodiments apply to memory systems constructed of one or more memory modules 110 that are connected to a memory controller 102 by a daisy chained memory channel 114 as depicted in FIG. 1. The memory modules 110 contain both a hub device 112 that buffers commands, address and data signals to and from the controller memory channel 114 as well as one or more memory devices 108 connected to the hub device 112. The downstream portion of the memory channel 114, the downstream channel 104, transmits write data and memory operation commands to the hub devices 112. The upstream portion of the controller channel 114, the upstream channel 106, returns requested read data (referred to herein as upstream data packets).

Figure 2:
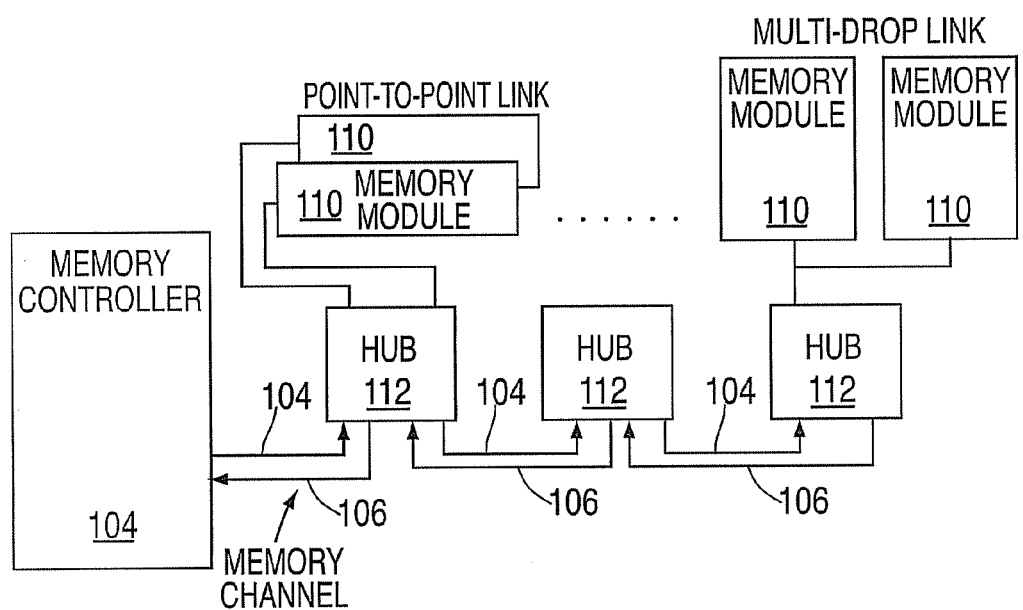
FIG. 2 depicts an exemplary memory system with hub devices that are connected to a memory modules and to a memory controller by a daisy chained channel.

FIG. 2 depicts an alternate exemplary embodiment that includes a memory system constructed of one or more memory modules 110 connected to hub devices 112 that are further connected to a memory controller 102 by a daisy chained memory channel 114. In this embodiment, the hub device 112 is not located on the memory module 110; instead the hub device 112 is in communication with the memory module 110. As depicted in FIG. 2, the memory modules 110 may be in communication with the hub devices 112 via multi-drop connections and/or point-to-point connections. Other hardware configurations are possible, for example exemplary embodiments may utilize only a single level of daisy chained hub devices 112 and/or memory modules 110.

Figure 3:
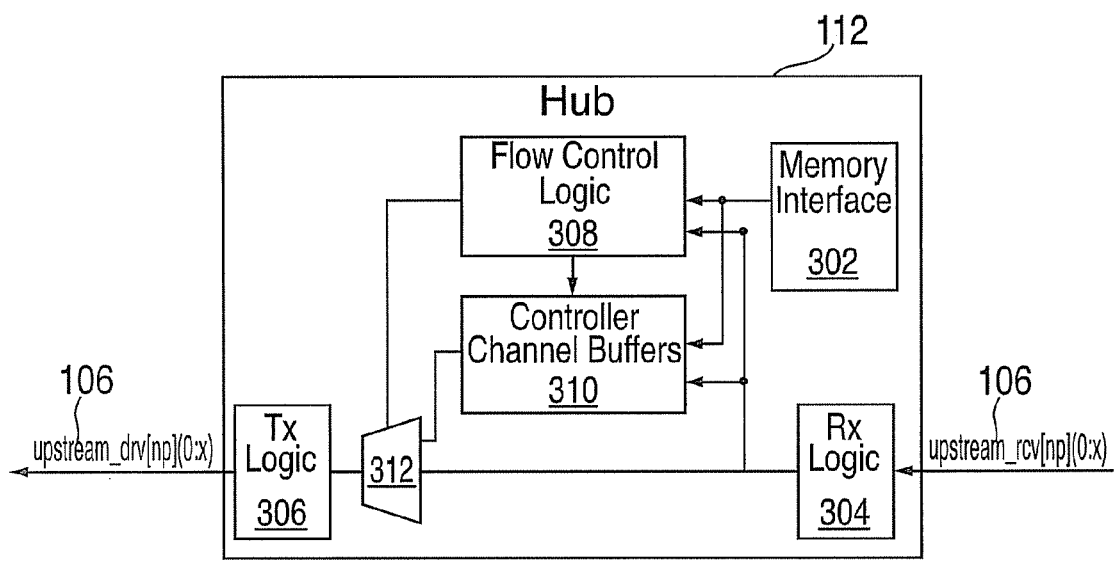
FIG. 3 depicts a hub logic device that may be utilized by exemplary embodiments.

FIG. 3 depicts a hub device 112 with flow control logic 308 utilized by exemplary embodiments to perform the processing described herein. The hub device 112 and the components within the hub device 112 may be implemented in hardware and/or software. The hub device 112 receives upstream data packets on the upstream channel 104 via the receiver logic 304 (also referred to herein as an upstream receiver). The upstream data packets are data packets being sent to the controller 102 from a hub device 112 that is downstream from the receiving hub device 112. An upstream data packet can be sent to the driver logic 306 (also referred to herein as the upstream driver) to be driven towards the controller 102 on the upstream channel 106 or, if the upstream channel 106 is busy, the upstream data packet can be temporarily stored in the CCB 310 on the hub device 112. The destination of the upstream data packet is determined by the flow control logic 308 and implemented by sending a signal to the local data mutliplexor 312.

In exemplary embodiments, CCBs 310, or buffer devices, reside in the hub device 112 and safely capture upstream data packet transfers (via the receiver logic 304) that are shunted into the CCB 310 while the hub device 112 is merging its local data packets onto the upstream channel 106. Local data packets are data packets that are read from memory devices 108 attached to the memory module 110 being directed by the hub device 112. These memory devices 108 are also referred to herein as local storage devices. The data read from the local storage devices, the local data packets, are formatted for return on an upstream controller interface via the upstream driver and stored in the CCB 310. The formatting includes serializing the local data packet into the proper frame format (e.g., see exemplary frame formats depicted in FIGS. 5), and inserting values into the identification tag (sourced from the read request, see example tag formats in FIGS. 7-8), first transfer field, and bus cyclical redundancy code (CRC) field. In exemplary embodiments, the formatting of the local data packet is performed as part of storing the local data packet into the CCB 310.

When a data packet is received at the memory interface 302, it is stored into the CCB 310 while the local data packets are waiting to be merged onto the upstream channel 106 (via the driver logic 306). The identification tag within the data packet allows the memory controller 102 to correlate a returned read data packet with its corresponding read data request command. The data packet also contains a small, easy to decode 'start', or first transfer ('ft') field (also referred to herein as a frame start indicator) delivered near the beginning of an upstream read data frame (data packets are formatted as read data frames) which indicates that a read data frame is present in the data packet. In an exemplary embodiment, this is used by the flow control logic 308 in the hub device 112 to monitor the channel read data activity.

When there is data in the CCBs 310 from either a local read operation or from a previously shunted read data packet from a downstream hub device (the data packets in the CCB are referred to herein as stored data packets), the hub device 112 will merge it onto the upstream channel 106 via the driver logic 306 as soon as it is allowed. The hub device 112 merges local data onto the upstream channel 106 whenever the upstream channel 106 is idle, or immediately following the last transfer of a data packet that is currently in progress. Read data frames will never be bisected using this method, but read data frames that are in flight on the upstream channel 106 that have not yet arrived at a hub device's 112 local data multiplexer 312 may be preempted and shunted into the CCB 310. This allows gaps in read data on the upstream channel 106 to be minimized which increases bus efficiency and results in reduced average read data latency under real world work load conditions.

When there are multiple read data packets present in the CCBs 310, the hub device 112 can be configured to send the read data packet corresponding to the earliest read command. This minimizes undue latency on read requests issued to hub devices 112 that are many daisy chain positions away from the memory controller 102. Other CCB 310 unload prioritization algorithms may also be implemented. For example, the identification tag field of the read data frame may contain a priority field. The priority field can be used to guide the unloading of the CCBs 310. Alternatively, priority information may be delivered as the read data is requested. Hub devices 112 can then compare the identification tag to previously recorded priority information to determine the location in the CCB 310 to send next. A method may also be employed that occasionally sends lower priority data before high priority data to ensure that low priority data is not completely stalled by requests that have been tagged with a higher priority.

Figure 4:
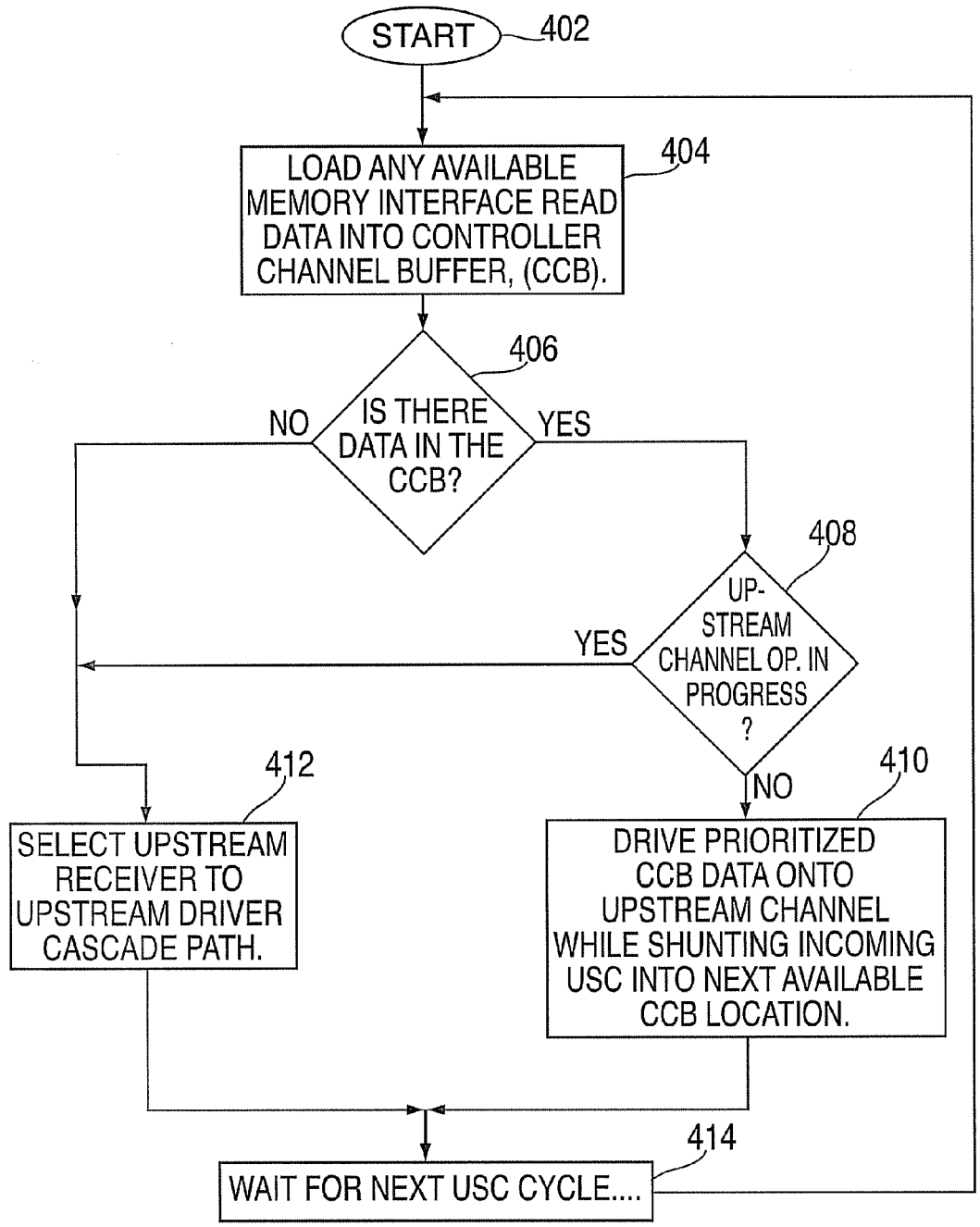
FIG. 4 is a exemplary process flow implemented by the hub logic device in exemplary embodiments.

FIG. 4 is a process flow that is facilitated by the flow control logic 308 located in the hub device 112 in exemplary embodiments. The process depicted in FIG. 4 performs preemptive local data merge and may be implemented by a mechanism including hardware and/or software instructions such as a finite state machine in the flow control logic 308. The process starts at block 402 and is repeated, in exemplary embodiments, on a periodic basis (e.g., after each controller channel transfer, or upstream channel cycle). At block 404 any local read data packets (i.e., from memory devices 108 on memory modules 110 attached to the hub device 112) in the memory interface 302 are loaded into the CCB 310. This insures that the flow control logic 308 is aware of and managing the upstream driving of local read data. At block 406, it is determined if there is data in the CCB 310. If there is no data in the CCB 310, then the data is routed from the receiver logic 304 to the driver logic 306 at block 412. The routing is directed by the flow control logic 308 by setting the local data multiplexer 312 to send the upstream data packet to the driver logic 306 for driving the upstream data packet onto the upstream channel 106 towards the controller 102. Processing then continues at 414, where processing is sent back to block 404 at the next upstream channel cycle.

If it is determined at block 406, that there is data in the CCB 310 then block 408 is performed to determine if an upstream channel operation is in process (i.e., is an upstream data packet or a local read data packet in the middle of being driven onto the upstream channel 106 via the driver logic 306). Processing continues at block 412 if an upstream channel operation is in process (i.e., the driver is busy). At block 412, upstream read data packets are routed from the receiver logic 304 to the driver logic 306 by setting the local data multiplexer 312 to send the upstream data packet to the driver logic 306. Alternatively, processing continues at block 410 if an upstream channel operation is not in process (i.e., the driver is idle) and there is data in the CCB 310. At block 410, data from the CCB 310 is driven onto the upstream channel 106 while any data packets received in the receiver logic 304 from the upstream channel 106 are shunted (stored) into the next available CCB 310 location. The shunting is performed by the flow control logic 308 directing the upstream data packets to be loaded into the CCB 310. Processing then continues at 414 which sends processing back to block 404 at the next upstream channel cycle.

Figure 5:
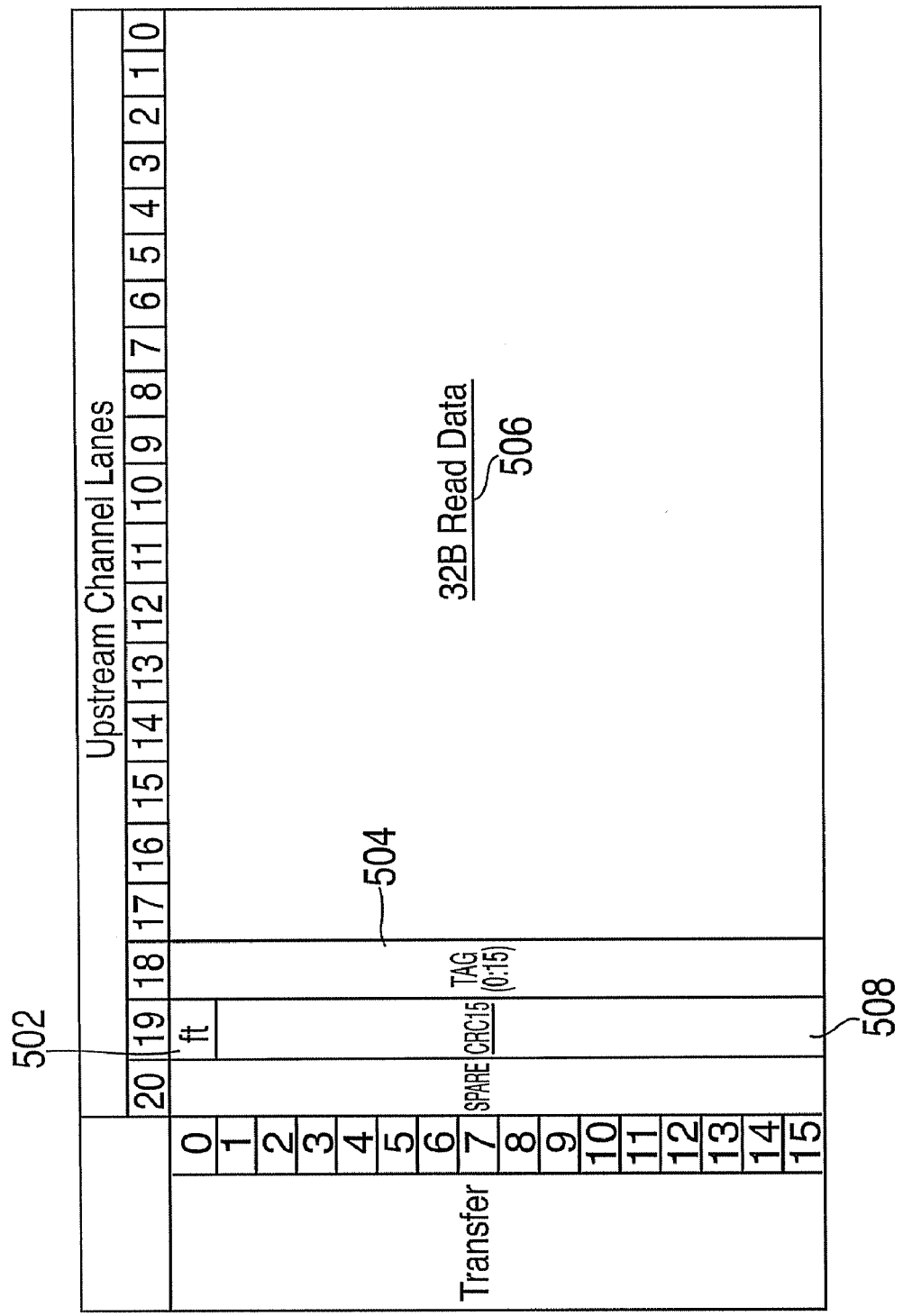
FIG. 5 is a read data format that may be utilized by exemplary embodiments.

FIG. 5 is an exemplary read data frame format for upstream data packets and local read data packets on the upstream channel 106. The frame format depicted in FIG. 5 uses twenty-one signal lanes and each packet includes sixteen transfers. It includes a one bit frame start indicator 502 and an identification tag 504, as well as 256 bits (32B) of read data 506 with bus CRC bits 508 for transmission error detection. Other combinations of signal lanes and transfer depths can be used to create frame formats that include a frame start indicator 502, read data identification tag 504 and read data 506 that are compatible with exemplary embodiments of the present invention.

In a memory system which includes the receipt of data packets at unpredicted times and/or the receipt of unrequested data transfers, an efficient and reliable method for the tagging of data is required to identify data received by a memory controller (or other processing device).

In an exemplary embodiment, such as that described herein, an upstream packet (or upstream frame) can be sent at any starting point when the bus is idle. Thus, upstream devices must be able to support the receipt of data at unpredicted times (also referred to as indeterminate data response times). This is different than memory controllers that support determinate data response times, where the upstream frames are scheduled to be sent on specific clock boundaries relative to previous (scheduled) data transfers, e.g. on 8, 12 or 16 cycle boundaries (modulo 8, modulo 12, etc.). When used in conjunction with the exemplary frame start indicator described in co-pending patent application Ser. No. 11/843,150, filed concurrently herewith, hereby incorporated by reference in its entirety, the exemplary identification tag 504 does not require data transfers to be initiated at known times and/or intervals.

In an exemplary embodiment, a data request initiated by an upstream device (e.g., a memory controller) includes a downstream identification tag. The upstream device generates the downstream identification tag to be included with the data request. As depicted in FIG. 6, an exemplary downstream identification tag 600 includes a source of the request field 602 (e.g. the memory controller or another hub device), a priority of the request field 604 (e.g. whether the information is needed immediately or the operation/response can be scheduled based on a pre-determined priority scheme allowing for multiple priorities such as "high", "medium" or "low" priority), and a request identifier field 606 (comprised, for example, of a sequential count with a pre-defined wrap limit). These fields are intended to be examples as alternate embodiments may include a subset of these fields and/or additional fields. In an exemplary embodiment, the downstream identification tag 600 comprises 16 bits, but other sizes are possible (e.g., 4, 8, 12, 20). In addition, the length of the fields may vary based on application requirements.

In an exemplary embodiment, when a data packet is received in response to a data request (e.g., a read request) from an upstream device, the data packet includes an upstream identification tag 504 to correlate the data packet to the data request. For an upstream data packet that is received in response to a request from an upstream device) the exemplary upstream identification tag 504 will generally include the tag information from the original request to facilitate the correlation of the response data to the original request. In addition, the upstream identification tag 504 may include other data, such as that depicted in FIG. 7.

FIG. 7 depicts an upstream identification tag 700 which may be implemented by an exemplary embodiment. The upstream identification tag 700 depicted in FIG. 7 includes fields from the downstream identification tag 600: a source of the request field 704, a priority of the request field 706, and a request identifier field 708. In addition, the upstream identification tag 700 depicted in FIG. 7 includes a requested identifier bit 702 (to identify that the data was specifically requested), a continuation bit 710 (indicating that additional information has been pre-fetched by the hub device and that the data will be transmitted on subsequent transfers, based, for example, on the priority of other bus operations); a source of the read data field 712 (e.g., an identifier which uniquely defines the sending device), and a fault tolerant encoding field 714 (e.g., parity, CRC, ECC or other encoding means may be used to maximize the integrity of the data tag and/or the entire bus transfer, such as an upstream frame).

Depending on the number of requests that can be initiated prior to corresponding data responses, in conjunction with the number of memory modules and/or hub devices on a given channel, in addition to other information included in the upstream identification tag 700, the tag field may comprise 8, 12, 16, 24 or other numbers of bit positions in the upstream frame. As an increased tag size reduces the effective data bandwidth of the system, field size should be determined via analysis of the effective bandwidth for each tag field size, in conjunction with any performance benefits that result from improved efficiencies due to the transfer of unrequested data (e.g. as a result of hub-initiated pre-fetch operations, local caching or other hub-based functions which will require data tagging and frame identification to maximize the benefits of these local functions). These fields are intended to be examples as alternate embodiments may include a subset of these fields and/or additional fields. In addition, the length of the fields may vary based on application requirements (e.g. the requested identifier bit field 702 may be two or more bits).

FIG. 8 depicts an exemplary upstream identification tag 800 which may be utilized for an upstream data packet which is locally initiated (e.g., by a hub device) and for which a data request (command) was not received. In this case, the exemplary upstream identification tag 800 includes locally developed tag information, which is defined such that the data is properly comprehended by the receiving device. The upstream identification tag 800 depicted in FIG. 8 includes a requested identifier bit 702 (e.g., to identify that the data was not requested), a physical address range of the data field 804 (e.g., minus least significant bits or "LSBs" which are unnecessary based on the specified burst length for the device), a source of the data field 806 (e.g., the hub address or identifier, if not included in the above address field), a reason for the unrequested data field 808 (e.g., due to a pre-fetch of a subsequent address range, generally this information will be included as one or more bits depending on the number of reasons for which the unrequested data is being provided), a priority of the read data field 810 (e.g., low, medium or high priority, based on a pre-defined labeling method), a continuation bit 812 (indicating that additional information has been pre-fetched by the hub device and that the data will be transmitted on subsequent transfers, based, for example, on the priority of other bus operations), and a fault tolerant encoding field 814 (e.g., parity, CRC, ECC or other encoding means may be used to maximize the integrity of the data tag and/or the entire bus transfer, such as an upstream frame).

In an alternate exemplary embodiment, the continuation bit 812 in the upstream identification tag 800 spans several bits and includes the identifier of the access that resulted in the speculative pre-fetch. In yet a further alternate exemplary embodiment, the continuation bit 812 spans several bits and includes a count indicating the distance of the new address from the original address (e.g. +1, +2, +4 etc. addresses beyond the original access, or −1, −2, −4 prior to the original access).

As described previously, the hub devices include registers that are loaded with the requested and/or unrequested data, in conjunction with the data tag and any other information required to comprise a valid frame. In an exemplary embodiment, the information in the registers is placed on the upstream bus once the bus is determined to be idle using a method such as the one described previously herein.

Figure 9:
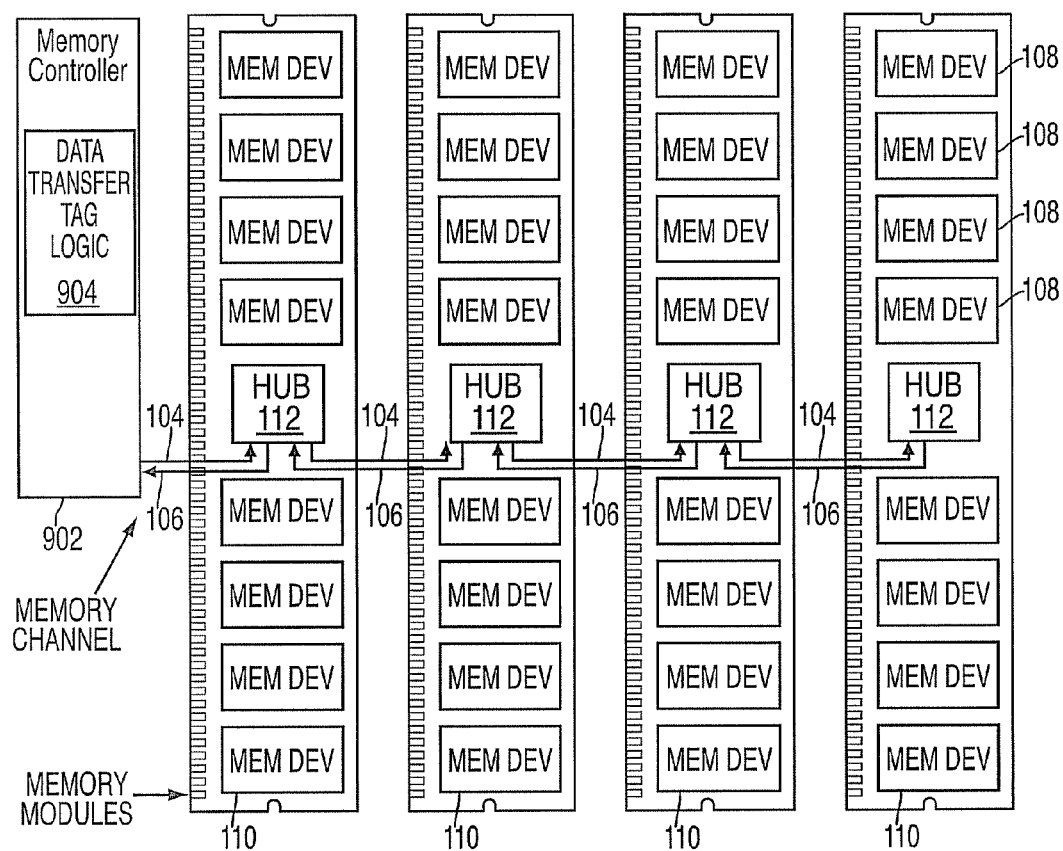
FIG. 9 depicts an exemplary memory system that may be implemented by exemplary embodiments.

FIG. 9 depicts an exemplary memory system that may be implemented by exemplary embodiments. FIG. 9 is similar to FIG. 1 and includes data transfer tag logic 904 in the memory controller 902. This provides the mechanism for the memory controller 902 to determine if a data packet received via an upstream channel is in response to a request from an upstream device (e.g., the memory controller 902). If the received data packet is in response to a request from an upstream device (which may be determined by the value stored in the requested identifier bit field 702), then the received data packet is matched to the request based on contents of the upstream identification tag 700. In an exemplary embodiment, the request from the upstream device includes a downstream identification tag 600 and the request identifier field 708 in the upstream identification tag 700 is matched to the request identifier field 606 in the downstream identification tag 600. If the data packet is not in response to a request from an upstream device (i.e., it is an unrequested data packet), then the contents of upstream identification tag 800 are read to determine what action to take with the unrequested data. In an exemplary embodiment, all or a subset of the contents of the unrequested data packet are stored in cache accessible by the memory controller 902. In this manner, the memory controller can support indeterminate data read including both requested and un-requested data frames.

As used herein the terms "mechanism" and "logic instructions" refer to circuitry and/or software instructions for implementing the described process.

Exemplary embodiments include a computing system with a processor(s) and an I/O unit(s) (e.g., requesters) interconnected to a memory system that contains a memory controller and memory devices. In exemplary embodiments, the memory system includes a processor or memory controller interfaced to a set of hub devices (also referred to as "hub chips"). The hub devices connect and interface to the memory devices. In exemplary embodiments the computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northblidge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency(ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency(ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the commuincation path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Exemplary embodiments pertain to a computer memory system constructed of daisy chained hub logic devices connected to, or contained upon, memory modules. The hubs are daisy chained on a memory controller channel and are further attached to memory devices on the memory modules. The memory controller issues requests for read data to the hubs which merge this read data from the memory modules onto the memory channel. Using channel buffers and packet identification tags, the hubs are able to return read data at a time unpredicted by the memory controller, and at a time that may preempt a read request that had been issued earlier, without loosing or corrupting any of the read data returned on the channel to the memory controller.

Technical effects include the ability to optimize average read data latency by more fully utilizing the upstream channel. Through the use of CCBs, read data frame formats with identification tags and a preemptive data merge technique, indeterminate read data latency may be performed to more fully utilize the controller channel.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory controller in a memory system, the memory controller comprising:
   a first mechanism for receiving data packets at indeterminate times via an upstream channel, the first mechanism comprising a means for identifying bits received via the upstream channel as corresponding to a received data packet; and a second mechanism including instructions for facilitating:

determining if the received data packet is in response to a request from the memory controller, wherein input to the determining includes an upstream identification tag included in the received data packet, the upstream identification tag comprising at least one bit indicating that the received data packet is in response to a request from the memory controller or indicating that the received data packet is not in response to a request from the memory controller;

determining if the received data packet is a partial response and that additional data related to the received data packet will be transferred in subsequent data packets, the determining responsive to inspecting a continuation bit in the received data packet; and matching the received data packet to the request responsive to determining that the received data packet is in response to a request from the memory controller.

2. The memory controller of claim 1, wherein the second mechanism further includes instructions for facilitating:

if the received data packet is determined not to be in response to a request from the memory controller, then processing the received data packet in response to contents of the upstream identification tag.

3. The memory controller of claim 2 wherein the upstream identification tag further comprises a physical address range of the data and a source of the data.

4. The memory controller of claim 3 wherein the upstream identification tag further includes one or more of a reason for the unrequested data, a priority of the data, one or more continuation bits and fault tolerant encoding.

5. The memory controller of claim 2 wherein the processing includes storing at least a subset of the received data packet in a cache accessible by the memory controller.

6. The memory controller of claim 1 wherein the upstream identification tag further includes a source of the request, a priority of the request, and a request identifier.

7. The memory controller of claim 1 wherein the upstream identification tag further includes one or more of a source of the data, fault tolerant encoding, and one or more continuation bits.

8. The memory controller of claim 1 wherein the request includes a downstream identification tag.

9. The memory controller of claim 8 wherein contents of the downstream identification tag are included in the upstream identification tag of a data packet that is received via an upstream channel in response to the request.

10. The memory controller of claim 8 wherein the downstream identification tag includes a priority of the request, a request identifier, and identifies the memory controller as the source of the request.

11. The memory controller of claim 1, wherein the identifying of the bits received via the upstream channel as corresponding to a received data packet comprises identifying at least one frame start indicator bit received via the upstream channel.

12. The memory controller of claim 1, wherein the bits received on the upstream channel are received during a plurality of bus cycles and the bits corresponding to the data packet are received during any of the plurality of bus cycles.

13. A method for providing indeterminate data response times in a memory system, the method comprising:

monitoring an upstream channel in a memory system;

determining that bits received on the upstream channel correspond to a data packet, the determining responsive to at least one bit received on the upstream channel at an indeterminate time indicating that the received bits correspond to the data packet;

receiving the data packet at an upstream device via the upstream channel, the data packet including an upstream identification tag and data, the upstream identification tag comprising at least one bit indicating that the data packet is in response to a request from the upstream device or indicating that the data packet is not in response to a request from the upstream device;

determining if the data packet is a partial response and that additional data related to the data packet will be transferred in subsequent data packets, the determining responsive to inspecting a continuation bit in the data packet;

determining if the received data packet is in response to a request from the upstream device, wherein input to the determining includes the upstream identification tag;

matching the received data packet to the request responsive to determining that the received data packet is in response to a request from the upstream device; and processing the data packet according to bits included in the received data packet, responsive to determining that the received data packet is not in response to a request from the upstream device.

14. The method of claim 13 wherein if the data packet is determined not to be in response to a request from the upstream device, then the upstream identification tag further comprises a physical address range of the data, and a source of the data.

15. The method of claim 14 wherein the upstream identification tag further includes one or more of a reason for the unrequested data, a priority of the data, one or more continuation bits and fault tolerant encoding.

16. The method of claim 13 wherein the matching includes matching a request identifier in a downstream identification tag associated with the request to a request identifier in the upstream identification tag.

17. The method of claim 13 wherein the upstream device is a memory controller.

18. The method of claim 13, wherein the at least one bit on the upstream channel indicating that the received bits correspond to the data packet is at least one frame start indicator bit.

19. The method of claim 13, wherein the data packet is received at an indeterminate time relative to a selected bus cycle of the upstream channel.

20. A hub device in a memory system, the hub device comprising:

a mechanism for creating a local data packet, the local data packet including an upstream identification tag for identifying contents of the data packet;

a mechanism for transmitting the local data packet to an upstream device, the upstream device one of a memory controller and an other hub device; a mechanism for receiving data packets at indeterminate times via an upstream channel, the mechanism comprising a means for identifying bits received via the upstream channel as corresponding to a received data packet;

a mechanism for storing a plurality of received data packets and forwarding each of the plurality of received data packets according to a priority and a chronological order, the priority determined by a priority field within each of the plurality of received data packets, and the chronological order determined by an order of a command requesting the received data packets; and a mechanism including instructions for facilitating:

determining if the received data packet is in response to a request from the hub device, wherein input to the determining includes an upstream identification tag included in the received data packet the upstream identification tag comprising at least one bit indicating that the received data packet is in response to a request from the hub device or indicating that the received data packet is not in response to a request from the hub device; and matching the received data packet to the request responsive to determining that the received data packet is in response to a request from the hub device.

* * * * *